United States Patent
Thomas et al.

(10) Patent No.: US 7,664,946 B2
(45) Date of Patent: Feb. 16, 2010

(54) SYSTEM AND METHOD OF GUARANTEED ANONYMITY OF CABLE TELEVISION VIEWERSHIP BEHAVIOR

(75) Inventors: Charles J. Thomas, Gulph Mills, PA (US); Thomas A. Brown, West Chester, PA (US)

(73) Assignee: QCOM TV Partners, Philadelphia, PA (US)

( * ) Notice: Subject to any disclaimer, the term of this patent is extended or adjusted under 35 U.S.C. 154(b) by 691 days.

(21) Appl. No.: 10/628,173

(22) Filed: Jul. 28, 2003

(65) Prior Publication Data

US 2005/0027986 A1 Feb. 3, 2005

(51) Int. Cl.
*H04L 9/06* (2006.01)
*H04N 7/167* (2006.01)
*H04H 60/33* (2008.01)
*H04N 7/173* (2006.01)

(52) U.S. Cl. .................. 713/150; 380/200; 725/9; 725/105

(58) Field of Classification Search ........... 713/150; 380/200; 725/105, 9
See application file for complete search history.

(56) References Cited

U.S. PATENT DOCUMENTS

| | | | |
|---|---|---|---|
| 5,245,656 A | | 9/1993 | Loeb et al. |
| 5,390,173 A | * | 2/1995 | Spinney et al. .............. 370/393 |
| 5,649,283 A | * | 7/1997 | Galler et al. ................. 725/87 |
| 6,006,257 A | * | 12/1999 | Slezak ........................ 725/110 |
| 6,272,152 B1 | * | 8/2001 | Levin et al. ................. 370/490 |
| 6,289,514 B1 | | 9/2001 | Link et al. |
| 6,598,231 B1 | * | 7/2003 | Basawapatna et al. ...... 725/120 |
| 6,993,137 B2 | * | 1/2006 | Fransdonk ................... 380/279 |
| 7,017,175 B2 | * | 3/2006 | Alao et al. .................. 725/105 |
| 7,055,165 B2 | * | 5/2006 | Connelly ..................... 725/9 |
| 7,110,714 B1 | * | 9/2006 | Kay et al. ................... 455/3.02 |
| 7,139,723 B2 | * | 11/2006 | Conkwright et al. ......... 705/10 |
| 7,472,423 B2 | * | 12/2008 | DeCenzo et al. ............. 726/26 |
| 2001/0012366 A1 | * | 8/2001 | Van Rijnsoever et al. ... 380/241 |
| 2001/0036224 A1 | * | 11/2001 | Demello et al. ............. 375/220 |
| 2002/0059632 A1 | * | 5/2002 | Link et al. ................... 725/108 |

(Continued)

FOREIGN PATENT DOCUMENTS

WO WO 02/05568 1/2002

(Continued)

OTHER PUBLICATIONS

Menezes, Alfred et al., Handbook of Applied Cryptography, CRC Press 1997, p. 393.*

(Continued)

*Primary Examiner*—Michael Pyzocha
(74) *Attorney, Agent, or Firm*—Caesar, Rivise, Bernstein, Cohen & Pokotilow, Ltd.

(57) ABSTRACT

A system and method for permitting viewership behavior on a cable television system, or satellite system, to be analyzed while guaranteeing the anonymity of the individual viewers. Using this system and method, the content of the message initiated by a consumer device, that is configured to receive television programming content, cannot be known by the cable operator even though the cable operator can identify the source of the message; alternatively, the entity that analyzes viewership behavior cannot know the source of the message but can know the content of the message.

22 Claims, 5 Drawing Sheets

U.S. PATENT DOCUMENTS

| | | |
|---|---|---|
| 2002/0194607 A1 | 12/2002 | Connelly |
| 2003/0079222 A1* | 4/2003 | Boykin et al. ................. 725/31 |
| 2003/0130893 A1* | 7/2003 | Farmer ....................... 705/14 |
| 2003/0158960 A1* | 8/2003 | Engberg ..................... 709/237 |
| 2003/0229892 A1* | 12/2003 | Sardera ......................... 725/9 |
| 2006/0080536 A1* | 4/2006 | Teppler ..................... 713/176 |

FOREIGN PATENT DOCUMENTS

WO    WO 03/021828    3/2003

OTHER PUBLICATIONS

International Search Report for PCT/US2004/020794, dated Nov. 16, 2004.

* cited by examiner

| FIG.1A | FIG.1B |

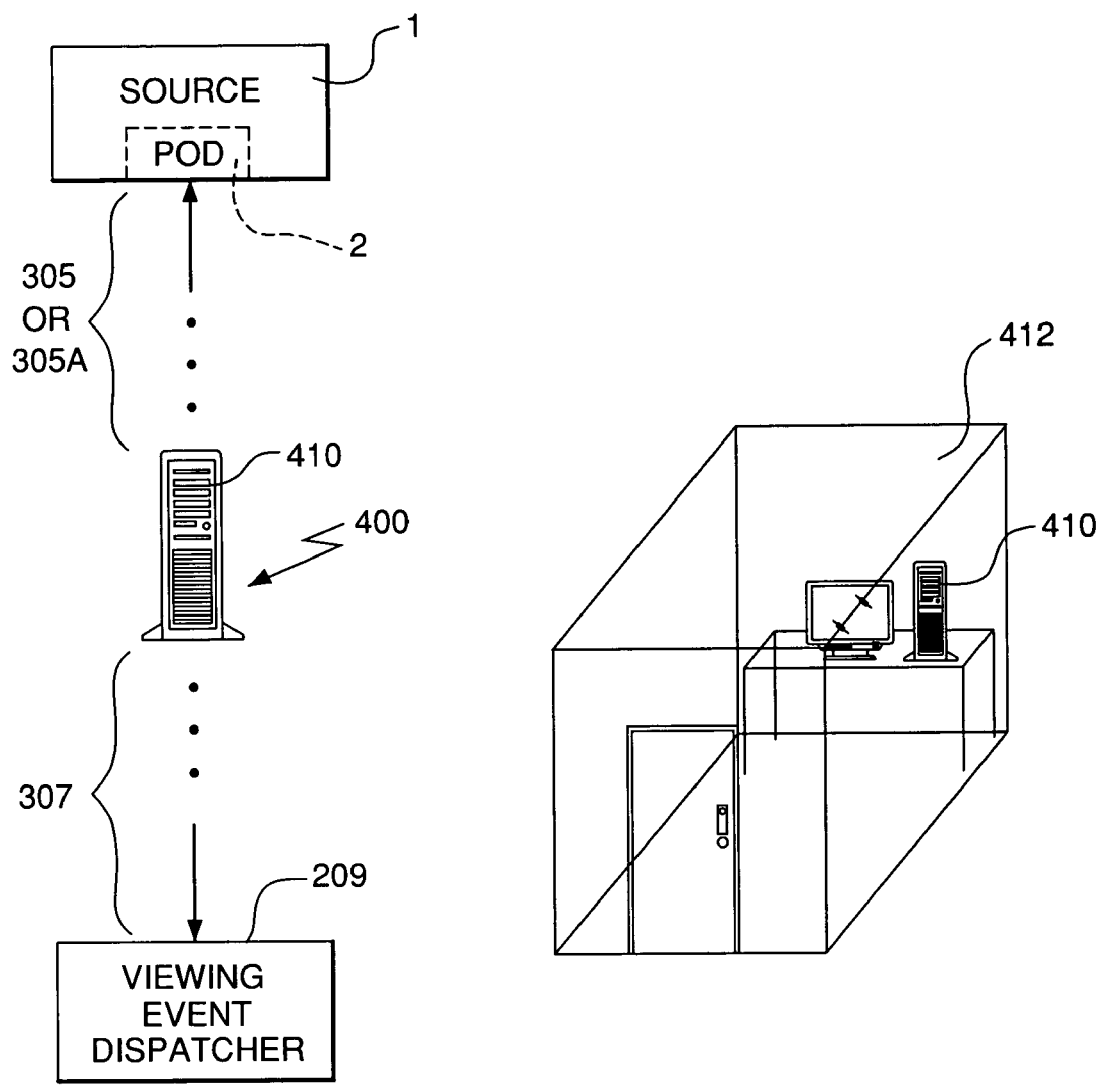

SYSTEM AND METHOD OF GUARANTEED ANONYMITY OF CABLE TELEVISION VIEWERSHIP BEHAVIOR

BACKGROUND OF THE INVENTION

1. Field of Invention

This invention relates to the field of automatic monitoring of cable television use, and more particularly, to a system and method for permitting viewership behavior to be analyzed while guaranteeing the anonymity of the individual viewers.

2. Description of Related Art

The following references are related to cable systems or data systems and the handling of communications between the users.

U.S. Pat. No. 6,289,514 (Link et al.), which is assigned to the same Assignee as the present invention, namely, QCOM TV, Inc., discloses a system and method for identifying television programming, identifying and capturing consumer behavior as regards such programming and providing a near-real time reporting of that information to interested parties while providing verification of actual delivery of advertising and/or program content.

WO 02/05568 (Link et al.) discloses a system and method for providing television programming which has been enabled for interactive purchase by viewers using their set top boxes over multiple channels for multiple merchant products/services and for delivering those purchase requests to the parties who provide fulfillment and billing for those requests. This system/method uses encryption in the transmission of purchase/transaction messages from viewers but, unlike the present invention, the source of the message needs to be known in order for the purchased item/services to be delivered to the originator of the request.

U.S. Pat. No. 5,835,087 (Herz, et al.) discloses a system for the generation of object profiles for customized electronic identification of desirable objects, such as news articles, in an electronic media environment. A target profile interest summary is generated for each user and a cryptographically-based pseudonym proxy server is used to provide the user with control over the ability of third parties to access this summary and to identify or contact the user. However, among other things, this system requires that the user actively participate in the establishment of the profile and this proxy server is able to translate from an individual to a pseudonym and then vice versa.

U.S. Pat. No. 5,872,588 (Aras et al.) discloses a monitoring system for audio-visual materials presented to subscribers and includes a privacy setting that allows the subscriber to prevent his/her viewing habits from being transmitted.

U.S. Pat. No. 5,245,656 (Loeb, et al)teaches how one might protect individually identifiable information by combining the use of an "authority", to translate from an individual ID (identification) to a pseudonym and back, with the use of profile data transmitted in encrypted form from a service provider computer. However, unlike the present invention, the "authority" in this system has the ability to translate in both directions.

U.S. patent application No. US 2002/0073435 (Handelman) discloses a cable TV system that uses a cable TV network, a multiplicity of subscriber units, and apparatus for transmitting encrypted information over the network of individually-addressed information to a subscriber unit and apparatus associated with each of the multiplicity of subscriber units for decoding the encrypted information.

U.S. patent application No. US 2002/0019781 (Shooks et al.) discloses a method and system for facilitating the anonymous purchase of goods and services from an e-commerce website. Funds are credited to a card account number in advance of use of a preset amount. However, a user of the card is anonymous by virtue of there being no name associated with the card. Use of this system requires active participation by the consumer to acquire the anonymous funds card.

U.S. patent application No. US 2002/0073046 (David) discloses a system and method for secure network purchasing and which uses encryption techniques to generate a password from a seed stored in a user's configuration file on the user's computer. However, use of this system requires the active participation of the consumer to establish an account with the merchant or service provider.

U.S. patent application No. US 2002/0108122 (Alao et al.) discloses a system for managing delivery of interactive television content from multiple diverse content or service sources to one or more set top boxes and managing the transaction dialogue from those set top boxes back to the diverse services. It provides a gateway and translation function which allows a set top box to interact with multiple services and content streams while only having to understand the one set of rules and protocols. Though encryption is discussed at various points, it does not make the set top box anonymous.

U.S. patent application No. US 2002/0108040 (Eskicioglu) discloses a method for providing conditional access to a received scrambled audio/visual signal from a variety of sources, e.g., broadcast TV networks, CATV networks, digital satellite systems and Internet service providers.

U.S. patent application No. US 2002/0107909 (Eyer et al.) discloses a method that allows a user who has access to an audio/visual object to cause an interactive control element of an interactive multimedia system to grab and store for future retrieval the audio/visual object by activating a selection mechanism of the interactive multi-media.

U.S. patent application No. US 2002/0108121 (Alao et al.) discloses a service gateway that provides a proxy between a client protocol and a plurality of standard communication protocols and utilizes encryption for interactive television.

U.S. patent application No. US 2002/0099948 (Kocher et al.) discloses a system whereby, before use, a population of tamper-resistant cryptographic enforcement devices is partitioned into groups and is issued one or more group keys. Each tamper-resistant device contains multiple computational units to control access to digital content. One of the computational units within each tamper-resistant device communicates with another of the computational units acting as an interface control processor, and which serves to protect the contents of a nonvolatile memory from unauthorized access.

U.S. patent application No. US 2002/0104098 (Zustack et al.) discloses a system whereby a subscriber class leases and provides programming for a digital television channel using the 2-way communication capabilities of a digital set top box. Encryption/decryption is used to prevent unauthorized access to programming content and whereby a decryption key can be transmitted over a video channel, or other communication channel, via modem.

U.S. patent application No. US 2002/0108034 (Hashem et al.) discloses a system and method for automatically encrypting and decrypting data for transmission using a process whereby a file is retrieved from a destination-based transmit folder, encrypting the file and then transmitting the file to an outgoing folder to the destination. The file is encrypted with an encryption process associated with the destination-based transmit folder.

U.S. patent application No. US 2002/0104083 (Hendricks et al.) discloses a system supporting targeted advertising directed to television terminals connected to an operations center or cable headend.

"Untraceable Electronic Mail, Return Addresses, and Digital Pseudonyms" by David Chaum (Communications of the ACM, Vol. 24, No. 2, Feb. 1981) teaches how encryption techniques can be used in conjunction with an intermediary authority to mask the source of an email while providing a mechanism by which the recipient can respond to the originator without disclosing who the originator might be. However, this approach requires that the "authority" be able to both encode and decode the originator's address.

"A Secure and Privacy-Protecting Protocol for Transmitting Personal Information between Organizations" by Chaum and Evertse demonstrates a proof that relies on the active participation of individuals (or their agent) to monitor and coordinate the distribution of personal information among organizations. In this instance, the "authority" is the individual who can associate the private information with a particular ID or pseudonym.

Thus, there remains a need for a system and method of guaranteeing the anonymity of the source of a message (wherein the source is coupled to a cable television system for receiving television programming content therefrom) but allowing the content of the message to be analyzed by a downstream entity without requiring intervention by the originator of the message.

All references cited herein are incorporated herein by reference in their entireties.

BRIEF SUMMARY OF THE INVENTION

A method for obscuring the identity of a source of a message while allowing the content of the message, and subsequent messages, issued from that source to be analyzed and wherein the source is coupled to a cable television system (this term also includes "satellite" systems) for receiving television programming content therefrom. The method comprises the steps of: encrypting the content of a message issued from the source (e.g., televisions, set top boxes, digital cable-ready set top boxes, cell phones, PDAs (personal digital assistants), computers and other similar devices having display screens that allow the user to receive and view television content from the cable television system) to form a first message wherein the first message contains source identification indicia and wherein the first message is transmitted to a remote device (e.g., a server); decrypting the first message into a first decrypted message upon receipt of the first message by the remote device; substituting the source identification indicia with anonymous identification indicia that cannot be traced back to the source identification indicia; and encrypting the first decrypted message along with the anonymous identification indicia into a second message and transmitting the second message to a location to be analyzed.

A system for obscuring the identity of the source of a message while allowing the content of the message, and subsequent messages, issued from that source to be analyzed, wherein the source is coupled to a cable television system (this term also includes "satellite" systems) for receiving television programming content therefrom, and wherein the source (e.g., televisions, set top boxes, digital cable-ready set top boxes, cell phones, PDAs (personal digital assistants), computers and other similar devices having display screens that allow the user to receive and view television content from the cable television system)of the message encrypts the message content while embedding source identifier indicia in the encrypted message. The system comprises a server, wherein the server comprises: means for decrypting the encrypted message into a first decrypted message; means for generating anonymous identification indicia and for substituting the source identifier indicia with the anonymous identification indicia to form a first decrypted message having the anonymous identification indicia embedded therein, and wherein the anonymous identification indicia prevents the first decrypted message from being traced back to the source identifier indicia; means for encrypting the first decrypted message having the anonymous identification indicia embedded therein to form a second encrypted message having the anonymous identification indicia embedded therein; and wherein the server transmits the second encrypted message having the anonymous identification indicia to message content analysis means.

BRIEF DESCRIPTION OF SEVERAL VIEWS OF THE DRAWINGS

The invention will be described in conjunction with the following drawings in which like reference numerals designate like elements and wherein:

FIG. 2 is a block diagram showing the present invention used between the source of a message and a viewing event dispatcher;

FIG. 3 is an isometric view of a secured location that houses the server of the present invention;

DETAILED DESCRIPTION OF THE INVENTION

The present invention 400 forms a portion of a cable television (this term is broadly construed to cover any and all variations of what is known in the art as "cable television" and "satellite systems") viewership behavior analysis system, such as that disclosed in U.S. Pat. No. 6,289,514 (Link et al.) whose entire disclosure is incorporated by reference herein. It should be understood that the viewership behavior analysis system of U.S. Pat. No. 6,289,514 (Link et al.)is cited by way of example only and that the present invention 400 can be adapted for use in any data system where knowledge of the source of a message and knowledge of the content of the message need to be exclusive of each other, as will be discussed in detail later.

Figures 1, 1A:
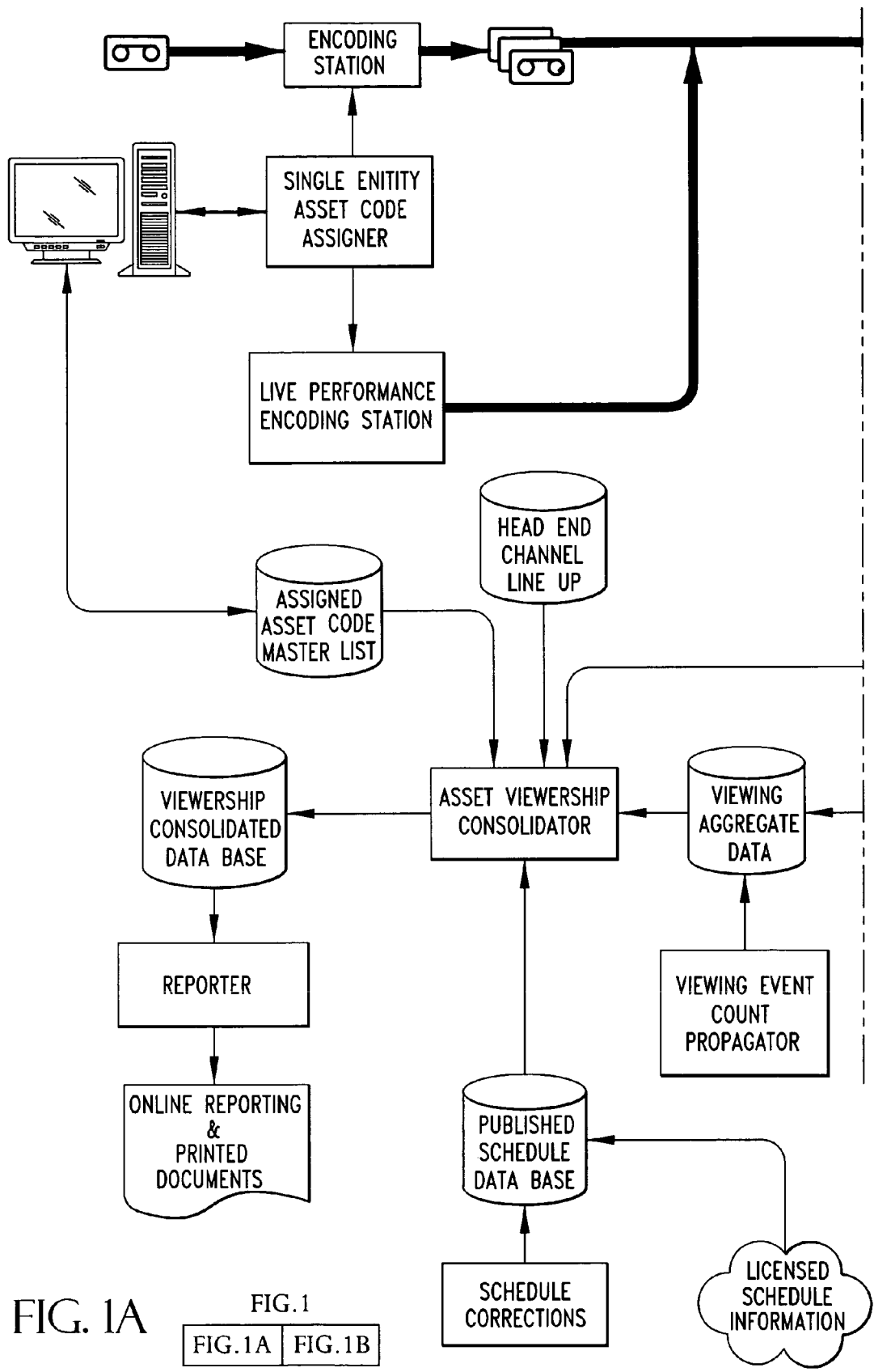
FIG. 1 is a figure layout for FIGS. 1A-1B.
FIGS. 1A-1B, together, constitute a block diagram of an exemplary viewership behavior analysis system similar to the one shown in U.S. Pat. No. 6,289,514 (Link et al.) which uses the present invention.
Figure 1B:
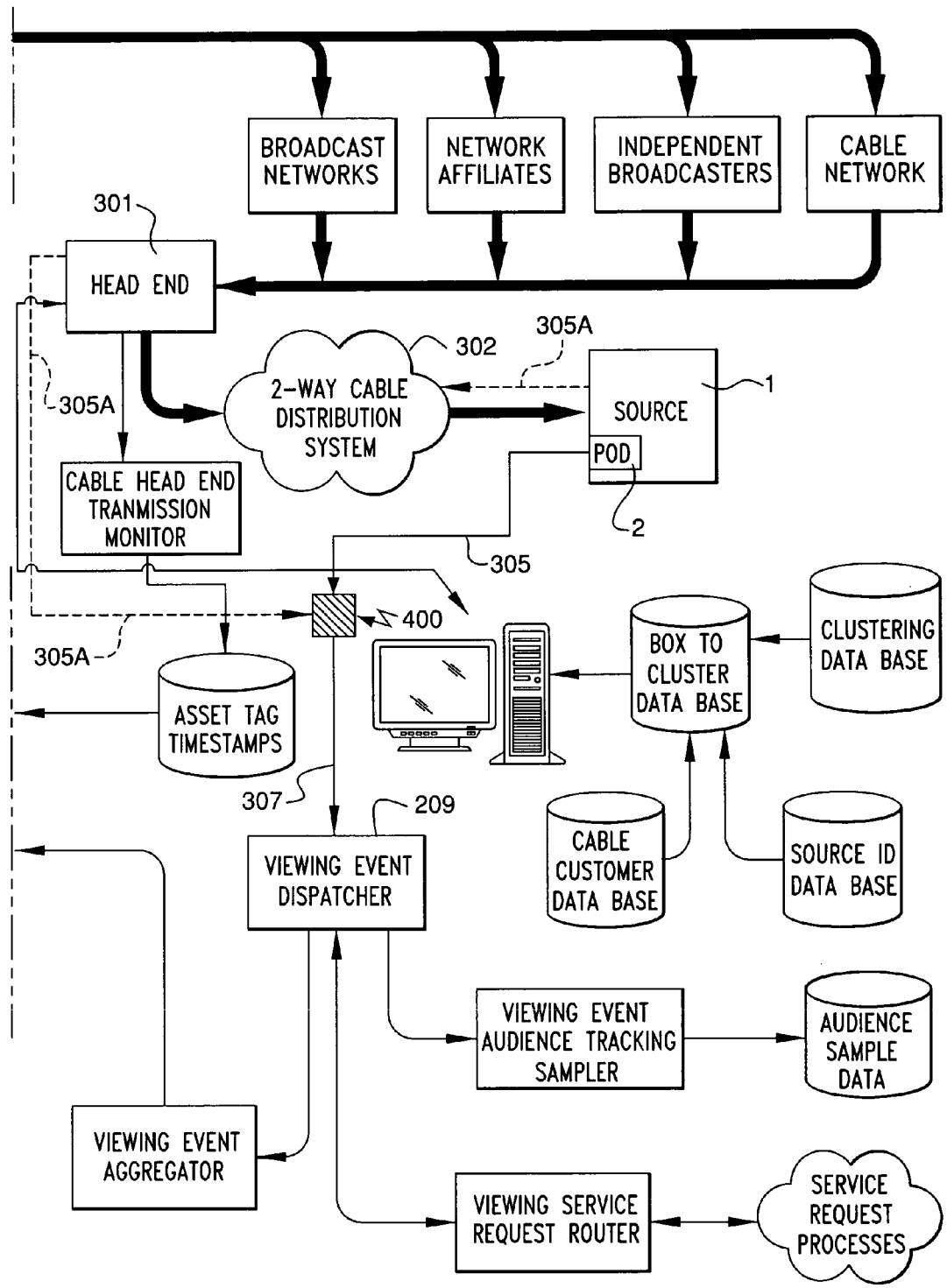

As shown in FIGS. 1A-1B, a viewership behavior analysis system (referred to as TPAS-television programming analysis system-in U.S. Pat. No. 6,289,514) identifies television programming, identifies and captures consumer behavior as regards such programming and provides a near-real time reporting of that information to interested parties (e.g., advertisers, television network programmers etc.), hereinafter generally-referred to throughout this Specification as "viewership behavior analysis entities." Television programming content is delivered to and viewable by consumers using such devices (hereinafter referred to as "sources 1" (FIG. 1B), the reason for which will be discussed shortly) as televisions, set top boxes, digital cable-ready set top boxes, cell phones, PDAs (personal digital assistants), computers and other similar devices having display screens that allow the user to receive and view television content from a cable television system to which these devices are connected. Where the source 1 is a cell phone, PDA, etc., a "pod" 2 (e.g., a memory chip such as a smart card, flash memory card, etc.) is inserted into the source 1. The pod 2 allows the source 1 to receive television programming content and also comprises a unique source ID. Thus, when the consumer obtains cable service from the cable system operator, the cable system operator issues the pod 2 to the user once all of the consumer information is obtained. Where the source 1 is a set top box (STB) or television, the pod 2 is not required.

Each source 1 contains an application program that "observes events" (e.g., channel change, volume level change, etc.) and which then generates a message regarding the event; as a result, each source 1 is a "source" of the event message and hence the label "source 1" is given to each of these devices. Where the source 1 uses a pod 2, it is the pod 2 that contains the application program.

In addition, each source 1 is assumed to have a unique ID, such as a serial number (and, as mentioned earlier, where the pod 2 is used, it is the pod 2 that contains the unique ID). That unique ID value is included in every message (e.g., an "event" message) that originates from the source 1 and is ultimately transmitted to an analysis processing function.

Although the analysis processing function does not form any part of the present invention, it should be understood that since the source 1 can include any of the aforementioned devices, not just set top boxes (STBs), the analysis processing functions shown in FIGS. 1A-1B have replaced the "STB" designator with "viewing" or "source", i.e., STB event dispatcher, STB event audience tracking sampler, STB event aggregator, STB service request router, Set Top Box ID database, STB aggregate data and STB event count propagator of FIGS. 1A-1B of U.S. Pat. No. 6,289,514 are now viewing event dispatcher, viewing event audience tracking sampler, viewing event aggregator, viewing service request router, source ID database, viewing aggregate data and viewing event count propagator in the present application but they are functionally the same as described in U.S. Pat. No. 6,289,514.

It is with particular regard to the conveyance of the message from the source 1 to the viewing event dispatcher 209 that the present invention 400 pertains. As a result, the viewership behavior analysis system will not be discussed in any further detail.

As shown in FIG. 2, the communication path 305/305A between the source 1 of the message, server 410 (which will be discussed in detail below) and the viewing event dispatcher 209 may comprise any well-known communication media, such as but not limited to a cable television system, Internet, wireless communication means, wide-area network (WAN), etc. Where the source 1 is a cell phone, PDA, computer, etc., and the where the pod 2 is used, the communication path 305 can be used. Alternatively, where a STB or cable-ready television is used, the cable system itself, i.e., communication path 305A (including the two-way cable system 302/cable head end 301) can be used. There are many various ways of implementing the communication path 305 between the source 1, server 410 and the viewing event dispatcher 209. Thus, it should be understood that the scope of the invention is not limited by how the source 1 of the message communicates with or to the server 410 nor how the server 410 communicates with or to the viewing event dispatcher 209.

Once the source 1 issues the message M over the communication path 305/305A, the message M arrives at the server 410, which comprises the present invention 400. As shown in FIG. 3, the server 410 is secured at location 412 that is under the control of the cable system operator, or managed by an associated entity (e.g., a subcontractor) of the cable system operator (this associated entity hereinafter referred to throughout this Specification as "agent" implying an "agent of the cable system operator"); the important feature of the secure location 412 is that the viewership behavior analysis entity has no control/access to that location 412 on its own. Access to the server 410 (which is owned and operated by the entity that conducts the viewership behavior analysis) is password protected and "locked down." The cable system operator does not have the password and therefore cannot access the server 410. The entity that conducts the viewership behavior analysis, for whom the event message M is destined, has the password but cannot gain access into the secure location 412 (inside which the server 410 is located) without cable system operator/agent supervision. Although various physical lock/key schemes can be used at the secure location 412, such as that used with safety deposit boxes at financial institutions (where the box owner has one key and the financial institution has another key, both of which are necessary to gain access to the box), the important feature is that no one except the viewership behavior analysis system entity can gain access to the server 410 itself. The importance of this secure feature will be discussed below.

Figure 4:
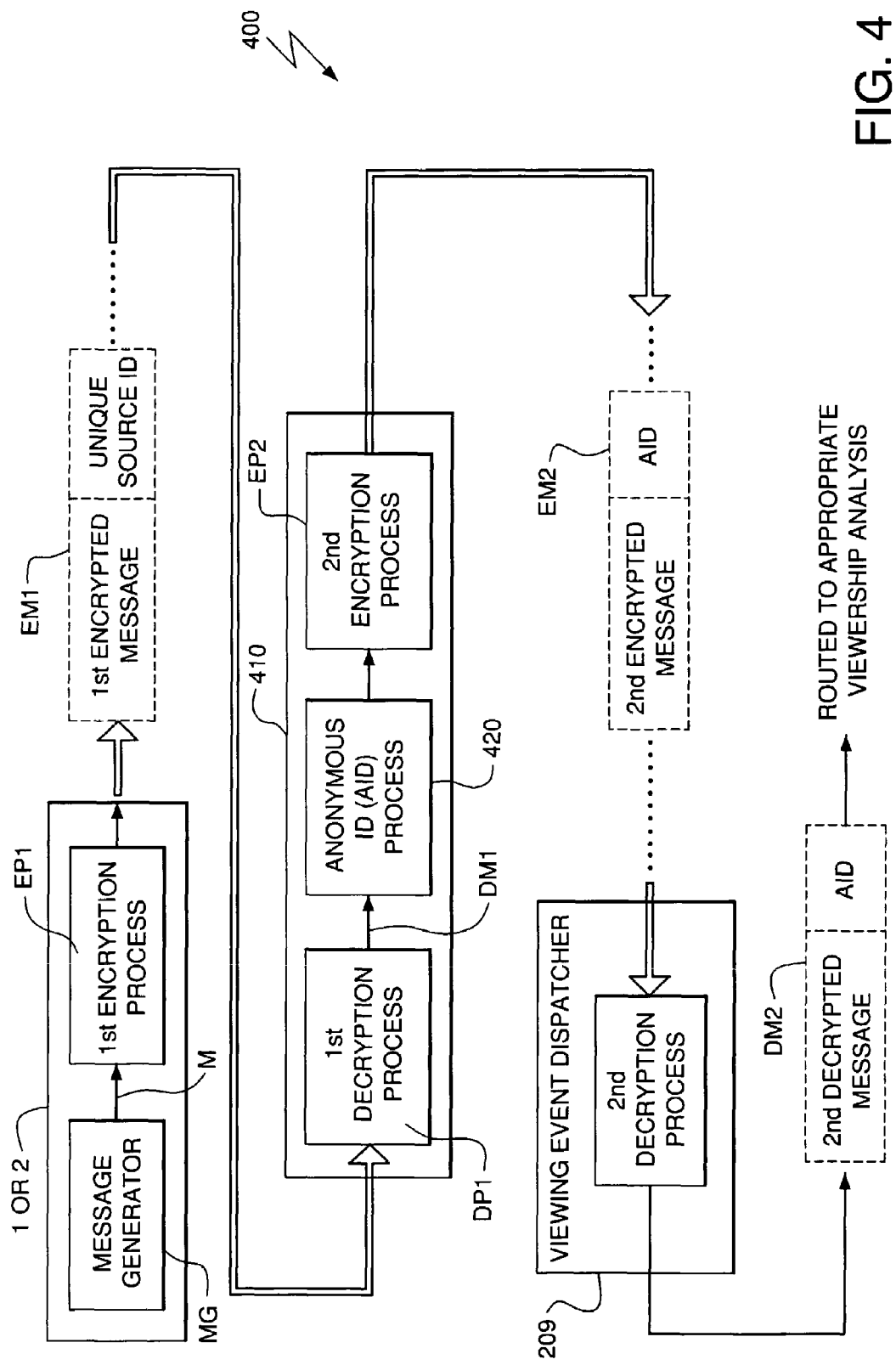
FIG. 4 is a functional diagram of the present invention.

As shown in FIG. 4, an internal message generator MG (e.g., the third party application disclosed in U.S. Pat. No. 6,289,514) of the source 1 (e.g., a STB) creates the "event message" M (when the television event occurs) which includes the identification number (ID) of the source 1 embedded therein. Message M is then inputted to a first encryption process EP1 which encrypts the television event message M, referred to as message EM1, but does not obscure the ID of the source 1; thus the source 1 transmits the message EM1 over the communication path 305/305A. In this format, the cable system operator has the ability to identify the source of the message EM1 but is unable to know the content of the message EM1.

When message EM1 is transmitted over the communication path 305/305A, it arrives at the server 410 where a first decryption process DP1 operates on the message EM1 to decrypt the message into decrypted message DM1. At this point, source 1 data which the cable company has previously obtained (e.g., zip code of the source 1, network segment, and other demographic information such as cluster codes, etc.) are inserted into the decrypted message DM1 (see FIG. 5).

The decrypted message DM1 is then sent to an anonymous ID (AID) process 420. Basically, in the AID process 420, the unique source ID value is extracted from the decrypted message DM1 and replaced with an anonymous ID. The AID that replaces the unique ID for the source 1 is consistent for every subsequent message for that unique source ID and is unduplicated across all other unique source IDs. In other words, once the AID is generated for a particular source 1, that same AID is used for subsequent messages corresponding to that particular source 1. However, the AID cannot be traced back to the actual source 1 by matching against cable customer records. The result is that the content of the message M initiated by the consumer's source 1 cannot be known by the cable operator even though the message may pass through the cable operator's systems (e.g., path 305A) or components (e.g. pod 2) and the cable system operator has the ability to identify the originating source 1; on the other hand, although the viewing event dispatcher 209 can determine the content of the message, the viewing event dispatcher 209 cannot, in any way, determine the identity of the originating source 1.

Subsequent messages having the AID are grouped based on the AID as having been initiated by a single source 1. More importantly, that process cannot use the AID to reverse engineer the AID back into the original unique source ID. Thus, the object of the present invention 400 protects the contents of the messages from others during its travel to the final destination.

The AID is created by utilizing a mathematically-based mechanism as opposed to a secured "look-up" or "cross-reference" type of mechanism (e.g., a secured database that cross-references the identity to a pseudonym). One example of such a mathematically-based mechanism that processing the unique source ID comprises using a combination of a proprietary character string and a portion of the unique source ID as a "seed" (i.e., an initial value). For example, if the unique source ID number is 12345678, the AID process 420 may extract the portion "4567" to form the seed and then using a mathematical hash to mix this portion with, again for example, the entire number "12345678" to generate the AID. Thus, each time the server receives the message EM1 from a particular source 1 and decrypts message EM1 into message DM1, the AID process extracts the same portion from the unique source ID number and then applies the mathematical hash to generate the same AID for each message subsequent that originates from that same source 1 and embed it in the message. The result is a unique and consistent AID. The created AID replaces the unique source ID in the decrypted message DM1.

Next, decrypted message DM1 is then fed through a second encryption process EP2 to form a second encrypted message EM2 that includes the AID. Message EM2 is then sent out on another communication path 307 (which also may comprise any well-known communication media, such as but not limited to a cable television system, Internet, wireless communication means, wide-area network (WAN), etc.) to the viewing event dispatcher 209. The viewing event dispatcher 209 comprises a second decryption process DP2 that decrypts the message into decrypted message DM2 and permits the viewing event dispatcher 209 to determine onto which destination it should send the decrypted message DM2; however, the decrypted message DM2 still comprises the AID, thereby preventing the viewing event dispatcher 209, as well as any other downstream processing, from ever determining which source 1 the message M originated from.

Figure 5:
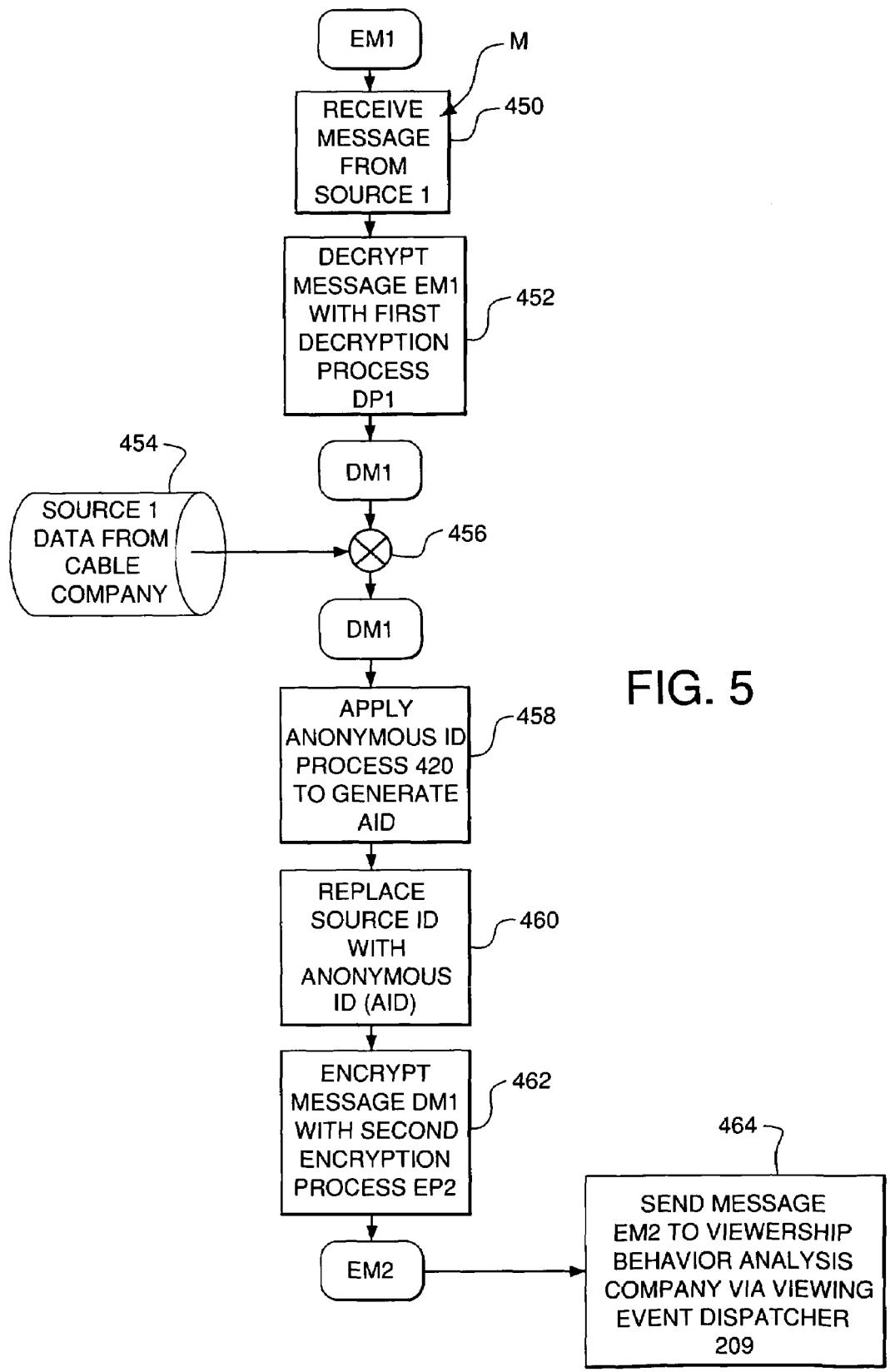
FIG. 5 is a flow diagram of the software of the present invention.

FIG. 5 is a flow diagram of the software of the present invention. In particular, in step 450 the server receives the encrypted message EM1. In step 452, the server activates the first decryption process DP1 to generate decrypted message DM1. In step 456, the software combines the cable company source 1 data from step 454 with the decrypted message DM1. Step 458 comprises the generation of the non-reversible AID, as discussed previously. In step 460, the unique source ID is replaced with the AID. Next, in step 462, the software then activates the second encryption process EP2 to generate the second encrypted message EM2. Finally, in step 464, the software transmits the encrypted message EM2 over the communication path 307 to the viewing event dispatcher 209.

As can be appreciated by the foregoing, all of these processes are automatic and do not require the intervention of the viewer from whose set top box the message M originates.

One example of the encryption and decryption algorithms that can be used in the present invention are those such as Kerberos Authentication encryption available from Massachusetts Institute of Technology at www.mit.edu/kerberos/www.

While the invention has been described in detail and with reference to specific examples thereof, it will be apparent to one skilled in the art that various changes and modifications can be made therein without departing from the spirit and scope thereof.

What is claimed is:

1. A method for obscuring an identity of a source of a message while allowing content of the message issued from that source to be analyzed, and wherein the source is coupled to a television system operated by a system operator for receiving television programming content therefrom, said method comprising the steps of:

obscuring the content of the message from a system operator by encrypting the content of a message issued from the source to form a first message, said first message containing source identification indicia and wherein the system operator knows the identity of the source of said first message, said first message being transmitted upstream to a remote device on the television system;

decrypting said first message into a first decrypted message upon receipt of said first message by said remote device;

generating anonymous identification indicia upon receipt of said first message by said remote device;

substituting said source identification indicia with anonymous identification indicia into said first decrypted message to form a second message, and wherein said anonymous identification indicia cannot be traced back to the source; and encrypting said second message and transmitting said second message to a location to be analyzed.

2. The method of claim 1 wherein said step of substituting said source identification indicia with anonymous identification indicia comprises generating said anonymous identification indicia by using a character string and a portion of said source identification indicia in a mathematical hash algorithm.

3. The method of claim 2 wherein said step of generating said anonymous identification indicia is repeated each time a subsequent message from a particular source is received such that said anonymous identification indicia is consistent for each source.

4. The method of claim 1 wherein said step of substituting said source identification indicia with anonymous identification indicia is performed at a secure location where a data analysis entity can only gain access with assistance from the system operator or an agent thereof and wherein the secure location comprises a computer that is password-protected and wherein the system operator, or an agent thereof, does not have the password but the data analysis entity does have the password.

5. The method of claim 1 further comprising the step of inserting cable system source data into said first decrypted message.

6. The method of claim 5 wherein said source data comprises cable system network segment data.

7. The method of claim 5 wherein said source data comprises cluster code data.

8. The method of claim 1 wherein said source is a set top box.

9. The method of claim 1 wherein said source is a cell phone.

10. The method of claim 1 wherein said source is a personal digital assistant.

11. A system for obscuring an identity of a source of a message while allowing content of the message issued from that source to be analyzed by a message content analysis means, said system comprising:

means for encrypting, said encrypting means encrypting the message content along with source identifier indicia in an encrypted message; and a server, said server comprising:

means for decrypting the encrypted message into a first decrypted message;

means for generating anonymous identification indicia and for substituting the source identifier indicia with said anonymous identification indicia to form a second message having said anonymous identification indicia embedded therein, wherein said anonymous identification indicia cannot be traced back to the source;

means for encrypting said second message having said anonymous identification indicia embedded therein to form a second encrypted message having said anonymous identification indicia embedded therein; and wherein said server transmits upstream said second encrypted message having said anonymous identification indicia to the message content analysis means.

12. The system of claim 11 wherein said means for generating anonymous identification indicia comprises a computer-readable medium having computer-executable instructions for using a character string and a portion of said source identification indicia in a mathematical hash algorithm to generate said anonymous identification indicia.

13. The system of claim 12 wherein said means for generating anonymous identification indicia repeats the use of said mathematical hash algorithm each time a subsequent message from a particular source is received such that said anonymous identification indicia is consistent for each source.

14. The system of claim 13 wherein said source is a set top box.

15. The system of claim 13 wherein the source comprises a memory chip that permits said source to receive the television programming content and wherein said source is a cell phone.

16. The system of claim 13 wherein the source comprises a memory chip that permits said source to receive the television programming content and wherein said source is a personal digital assistant.

17. The system of claim 13 further comprising means for inserting cable system source data into said first decrypted message.

18. The method of claim 17 wherein said source data comprises cable system network segment data.

19. The method of claim 17 wherein said source data comprises cluster code data.

20. The system of claim 11 wherein said server is positioned at a secure location where a data analysis entity can only gain access to said secure location with assistance from the system operator or agent thereof and wherein said means for generating anonymous identification indicia comprises a computer that is password-protected and wherein the system operator does not have the password but the data analysis entity does have the password.

21. A method for obscuring an identity of a source of a message while allowing content of the message issued from that source to be analyzed by a data analysis entity, and wherein the source is coupled to a television system operated by a system operator for receiving television programming content therefrom, said method comprising the steps of:

obscuring the content of the message from a system operator by encrypting the content of a message issued from the source to form a first message, said first message containing source identification indicia and wherein the system operator knows the identity of the source of said first message, said first message being transmitted upstream to a remote device on the television system;

decrypting said first message into a first decrypted message upon receipt of said first message by said remote device;

generating anonymous identification indicia upon receipt of said first message by said remote device;

substituting said source identification indicia with anonymous identification indicia, and wherein said anonymous identification indicia cannot be traced back to the source by the data analysis entity; and encrypting said first decrypted message along with said anonymous identification indicia into a second message and transmitting said second message to a location to be analyzed.

22. A system for obscuring an identity of a source of a message while allowing content of the message to be analyzed, said system comprising:

an encrypting device adapted to encrypt the message content along with source identifier indicia in an encrypted message; and a server, said server comprising:

means for decrypting the encrypted message into a first decrypted message;

a generator adapted to generate anonymous identification indicia upon receipt of said encrypted message and to substitute the source identifier indicia with said anonymous identification indicia wherein said anonymous identification indicia cannot be traced back to the source by the data analysis entity;

an encryption device adapted to encrypt said first decrypted message having said anonymous identification indicia embedded therein to form a second encrypted message having said anonymous identification indicia embedded therein; and wherein said server transmits upstream said second encrypted message having said anonymous identification indicia.

* * * * *

UNITED STATES PATENT AND TRADEMARK OFFICE
CERTIFICATE OF CORRECTION

PATENT NO. : 7,664,946 B2 Page 1 of 1
APPLICATION NO. : 10/628173
DATED : February 16, 2010
INVENTOR(S) : Thomas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1333 days.

Signed and Sealed this

Twenty-eighth Day of December, 2010

David J. Kappos
*Director of the United States Patent and Trademark Office*